United States Patent [19]

Farrow et al.

[11] Patent Number: 5,328,320

[45] Date of Patent: Jul. 12, 1994

[54] APPARATUS FOR LIFTING A HEAVY LOAD WITH RESPECT TO THE BED OF A TRUCK

[75] Inventors: J. Thomas Farrow, 1413 British, Grand Prairie, Tex. 75050; Roy L. Chandler, Arlington, Tex.

[73] Assignee: J. Thomas Farrow, Grand Prairie, Tex.

[21] Appl. No.: 797,501

[22] Filed: Nov. 22, 1991

[51] Int. Cl.[5] ............................................. B60P 1/00
[52] U.S. Cl. ............................ 414/495; 414/537; 414/498; 414/917; 414/480; 254/10 C
[58] Field of Search ............... 414/917, 495, 498, 537, 414/589, 590, 346, 350, 558, 486, 480, 471; 254/3 R, 3 B, 3 C, 10 R, 10 B, 10 C, 418, 93 RA; 187/9 R

[56] References Cited

U.S. PATENT DOCUMENTS

| | | | |
|---|---|---|---|
| 1,807,269 | 5/1931 | Abbe | 254/10 C |
| 2,181,881 | 12/1939 | Ferris | 254/10 R X |
| 2,379,094 | 6/1945 | Maxon, Jr. | |
| 2,686,036 | 8/1954 | Quayle | 254/10 C |
| 3,348,893 | 10/1967 | Katzfey et al. | 254/10 C X |
| 3,623,617 | 11/1971 | Nemessanyl | 414/495 X |
| 4,902,188 | 2/1990 | Page | 414/537 X |

FOREIGN PATENT DOCUMENTS

| | | | |
|---|---|---|---|
| 3302915 | 8/1984 | Fed. Rep. of Germany | 414/537 |
| 1192083 | 10/1959 | France | 414/498 |
| 1568893 | 4/1969 | France | 414/498 |
| 1523428 | 11/1989 | U.S.S.R. | 414/537 |
| 334632 | 9/1930 | United Kingdom | 414/537 |
| 948432 | 2/1964 | United Kingdom | 414/495 |

Primary Examiner—Frank E. Werner
Attorney, Agent, or Firm—Charles W. McHugh

[57] ABSTRACT

An apparatus adapted for attachment to the frame of a truck, usually within a bed of a conventional pickup truck. A generally planar base is rigidly attached to the truck frame with bolts. A platform is rotatably connected to the base with a pair of four-bar linkages, one on the right side of the platform and one on the left. The platform has a low position close to the base, and a high position that is typically 15 or 20 inches higher. A double-acting hydraulic cylinder is anchored at one end to the base and connected at its other end to the platform. Pressurizing the cylinder one way causes the platform to be raised and translated backwardly with respect to the base. Pressurizing the cylinder the other way causes the platform to be moved toward the base in a relatively slow and deliberate manner.

To improve the angles through which the hydraulic cylinder acts when the platform is being raised and lowered—especially when the platform is relatively close to the base, a bell crank mechanism is provided between the base and the barrel end of the hydraulic cylinder. As the hydraulic cylinder is pressurized for upward movement, the bell crank rotates and causes the platform to be lifted for a few inches. A low-friction device like a roller pushes against a lower surface of the platform, moving the platform upward until the pushing angle of the hydraulic cylinder is sufficient to cause more efficient lifting of the platform.

15 Claims, 4 Drawing Sheets

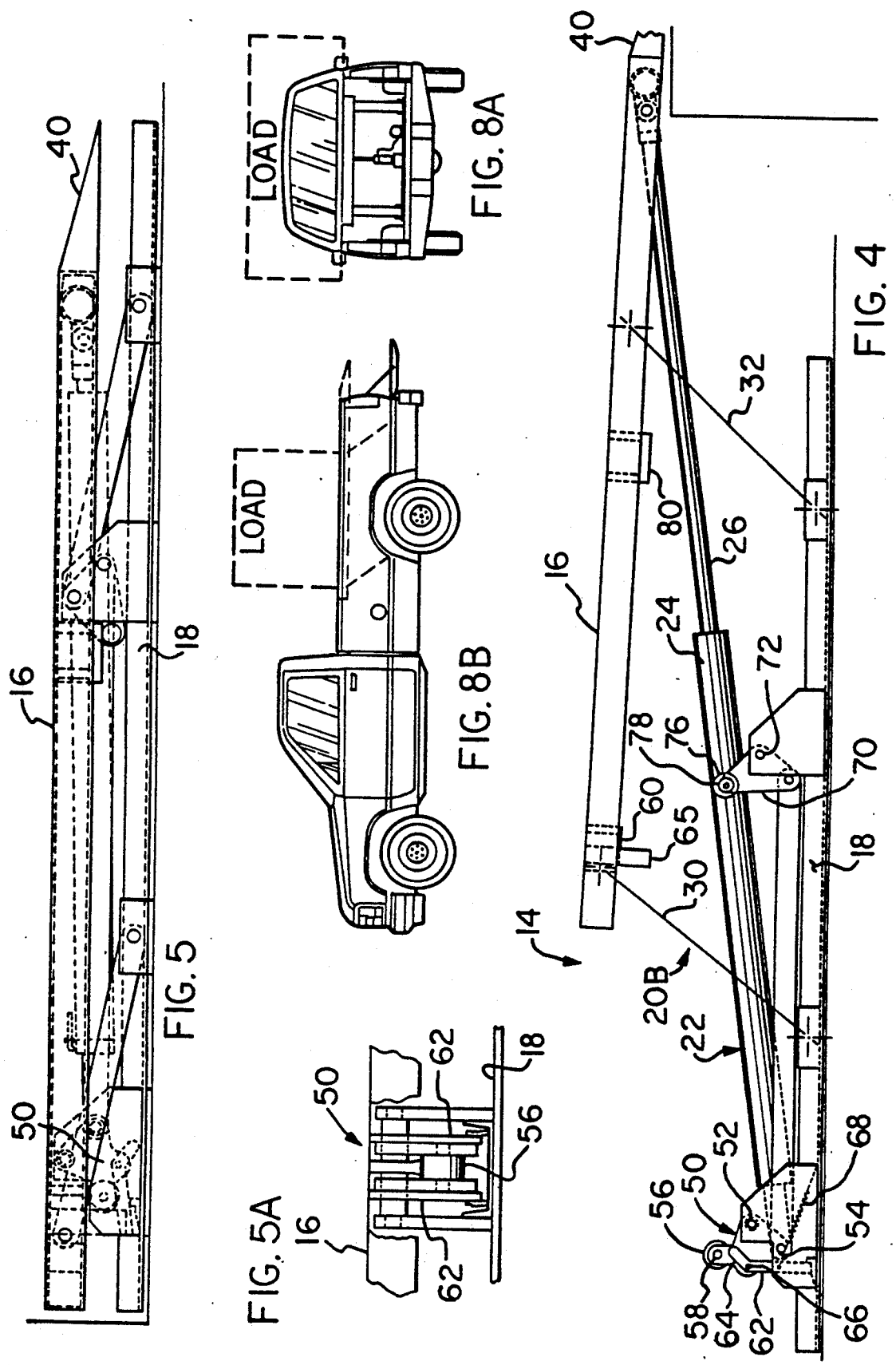

APPARATUS FOR LIFTING A HEAVY LOAD WITH RESPECT TO THE BED OF A TRUCK

BACKGROUND OF THE INVENTION

This invention relates generally to lifting devices in which a platform is elevated with respect to a fixed base by use of a hydraulic cylinder and a four-bar linkage; more specifically, it relates to an apparatus in which a platform is adapted to be attached to the frame of a truck, so that the platform may be selectively raised and lowered with respect to the truck's frame.

There are many instances in which a heavy load needs to be raised and lowered at a selected time and place and without the use of manual labor. A very common example of this requirement may be found at major airports, where goods are loaded onto a platform at something close to ground level and subsequently unloaded onto an aircraft at a substantially higher level. The highly specialized—and expensive—vehicles that perform this task are exemplified by the vehicles shown in U.S. Pat. No. 2,379,094 to Glenway Maxon Jr. entitled "Air Freight Handling System." The Maxon patent perhaps demonstrates, as well as can be done, that if there is a will to accomplish some task, and there is no limit on the amount of money that can be spent, then specialized equipment can be designed and built to do most any job.

There are frequent occasions, however, where the cost to design, build and maintain a vehicle with lifting capability is significantly restrained by budget considerations. In fact, there are many instances in which a company might like to have a vehicle with a movable platform on occasions, but the company cannot justify the expense of purchasing and maintaining a vehicle that cannot be used one-hundred percent of the time. Of course, many rental yards have been established and have grown on the basis of making exotic or specialized equipment available for short-term rental to companies that only occasionally need a specialized piece of equipment. One disadvantage to using rental equipment only on a "when-needed" basis is that the equipment may have already been rented to another party on the one day that a company needs it. Hence, it would be desirable to have a piece of lifting equipment available one-hundred percent of the time but at a modest cost, so that a company could afford to have its own equipment available whenever it is needed.

One example of a situation in which a heavy-duty lifting platform is desirable is when a load must be delivered to or received from a warehouse that has only conventional (high) loading docks. Such docks are designed for handling merchandise that is delivered with large vehicles, such as trailers that form parts of multi-wheel (e.g., 18-wheel) tractor/trailer rigs, and are conventionally placed at a height of about 48 inches above ground level. When a trailer or heavy truck is backed up to such a dock, conventional load-handling equipment that is routinely used within a warehouse (e.g., fork-lift trucks and pallet jacks) can be utilized to load and unload goods, because they can roll directly onto the bed of the relatively high trailer or truck.

However, there are also many instances in which the volume of a particular load does not justify the use of a large truck or trailer, even though the weight of the load makes it impractical to try to handle it by hand. For example, a load consisting of a large casting, an engine, a pump, or a pallet of hardware may occupy only a few cubic feet—but weigh 500 pounds. Such a load might be impractical to handle manually because of safety, time and other considerations. It would be desirable, therefore, if a light-weight truck (such as a half-ton, three-quarter ton, or one-ton pickup truck or the like) could be utilized to receive and transport a 900-pound load on a pallet, and then deliver that load to another high dock without requiring any manual handling of the load. Unfortunately, the customary height for lowered tail gates on a full-size pickups in the United States is about 30 to 36 inches. Hence, there can often be an elevation difference of about 20 inches between the bed of a pickup and a standard commercial dock; and there is no conventional warehouse equipment that can safely and dependably lower heavy loads a distance of 20 inches below a dock—unless it is a conveyor or ramp that is many feet in length. There has remained a need, therefore, for some mechanism that could dependably handle a load of several hundred, or even a few thousand, pounds, and move that load—in elevation—a distance of 20 or more inches. With such a mechanism, a conventional pickup truck rated at one-half to one ton could be utilized to handle goods that must be transferred onto a conventional "high" loading dock. It is an object of this invention to provide such a mechanism.

It is another object to provide an accessory that can be selectively attached to, and removed from, the bed of a truck without imposing any exotic requirements on the truck, so that standard commercial trucks can be utilized as the prime mover for the apparatus contemplated herein.

One more object is provide an accessory for a pickup truck or van that occupies relatively little space, so that the pickup or van can still be utilized in a conventional manner when the lifting platform is not required.

These and other objects will be apparent from a careful reading of the specification and claims, and the drawing that is attached hereto.

BRIEF DESCRIPTION OF THE FIGURES OF THE DRAWING

FIG. 4 is a side elevational view of the apparatus shown in FIG. 1, with the platform being shown in the most rearward position that it can assume with respect to the base;

FIG. 5 is a side elevational view showing the apparatus—without the truck—in its lowest position, equivalent to the showing in FIG. 3;

FIG. 5A is a fragmentary elevational view, as seen from the front of the apparatus, showing some additional details of the bell crank assembly;

FIGS. 8A and 8B are rear end and side elevational views of the box of a an exemplary pickup truck, showing the platform positioned at an elevation such that a wide load can be carried by the truck without running the risk that the sidewalls of the box might suffer any damage from the weight of the load.

BRIEF DESCRIPTION OF THE INVENTION

In brief, the invention comprises an apparatus that is adapted to be attached to the frame of a truck, above the frame and—usually—within a bed or equivalent structure that is attached to the truck. The most common application for the apparatus is likely to be installation in conventional pickup trucks or vans, such that the apparatus will be mounted within the bed of a pickup or inside the cargo space of a van. The apparatus includes a generally planar base that is rigidly attached to the truck frame with a few sturdy bolts. A platform is positioned above and connected to the base with a pair of four-bar linkages, with one linkage being adjacent the right side of the platform and the other linkage being adjacent the left side. The platform has a first, low position at which it is in relatively close proximity to the base; the platform has a second, high position at which it is appreciably higher than the base, typically on the order of 15 or 20 inches higher.

A double-acting hydraulic cylinder has a barrel and an extensible rod connected to a piston. One end of the barrel constitutes an end of the cylinder, and the distal end of the rod constitutes the other end of the cylinder. The hydraulic cylinder is mounted so that one of its ends is anchored to the base and its other end is connected to the platform. In the preferred embodiment the barrel end is anchored to the fixed base and the rod end is connected to the movable platform. Pressurizing the cylinder in one way can causes the piston to move outwardly, extending the rod and causing the platform to be raised with respect to the base. Pressurizing the cylinder the other way can cause the piston to move inwardly, retracting the rod and causing the platform to be lowered in a relatively slow and very deliberate manner.

In order to improve the angles through which the hydraulic cylinder acts when the platform is being raised and lowered—and especially when the platform is relatively close to the base, a bell crank mechanism is provided between the base and the barrel end of the hydraulic cylinder. As the hydraulic cylinder is pressurized for upward movement, the bell crank rotates and causes the platform to be lifted for a few inches, e.g., six inches. A low-friction device (such as a roller) pushes against a lower surface of the platform, moving the platform upward until the pushing angle of the hydraulic cylinder is sufficient to cause more rapid lifting of the platform. An electrically operated hydraulic pump is also provided as a part of the apparatus. In the preferred embodiment the pump is mounted inside the bed of a truck, where it is readily available for inspection and, if necessary, maintenance. Assuming that the pump is electrically powered, an auxiliary battery may also be advantageously provided as a part of the apparatus, to ensure that there will be adequate electrical power to operate the motor that drives the pump.

DETAILED DESCRIPTION OF A PREFERRED EMBODIMENT OF THE INVENTION

Figure 1:
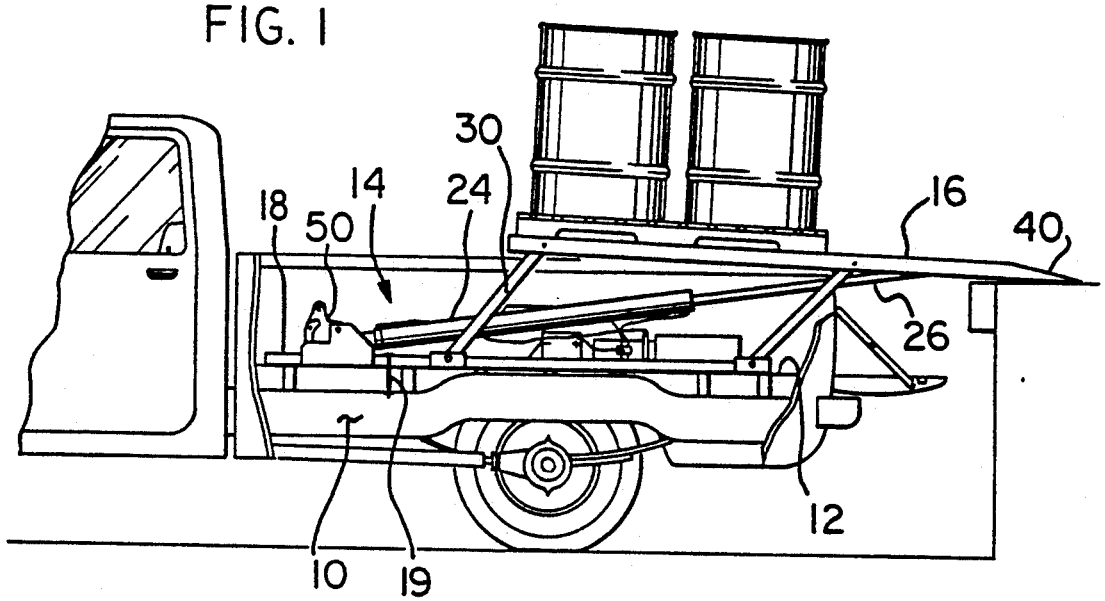
FIG. 1 is a side elevational view, partially sectioned, showing an apparatus in accordance with the invention, said apparatus being mounted within the box of a pickup truck, and said apparatus including a movable platform that is shown in an elevated position where it can be used to discharge goods onto a loading dock that is significantly higher than the bed of the truck.

Referring initially to FIG. 1, a pickup truck is shown backed up to a conventional loading dock, said dock having a height of about 48 inches above the level of the surface where the truck is parked. As is customary with such trucks, there is a frame that extends from the front of the truck to the rear thereof, and all of the body parts and the engine are supported by said frame. A portion of the truck's left sidewall has been broken away to reveal a segment of the truck's frame 10, etc. The truck's bed 12 is mounted above the frame 10 in a conventional manner and it does not have to be modified in any way in order to accept the apparatus 14 between the two sidewalls of the truck's box. Of course, trucks may also be purchased without a box, which would eliminate any concern about sizing an apparatus 14 to fit within a standard box.

The apparatus 14 includes a platform 16 that is positioned above and connected to a base 18 through a pair of four-bar linkages. The base 18 is fixedly connected to the frame 10 with two or more bolts 20, one of which is illustrated. When the truck is parked and the frame 10 is static, the base 18 will be similarly static.

Figure 2:
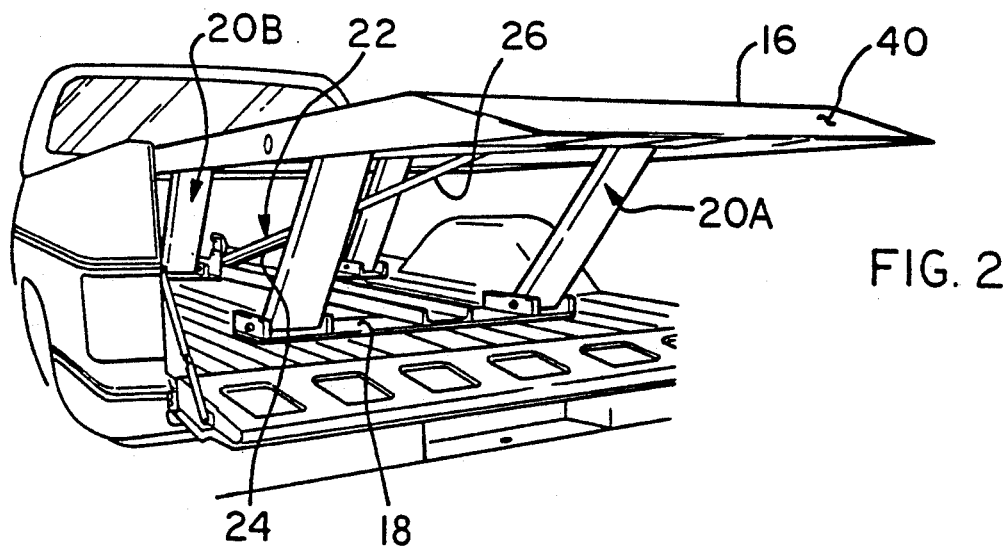
FIG. 2 is a perspective view of the truck and much of the apparatus shown in FIG. 1 (with some parts being omitted for clarity), and the view being taken at an angle that more clearly shows the four-bar linkage which is used to controllably raise and lower the platform.

Referring additionally to FIG. 2, the platform 16 is connected to the base 18 with a pair of four-bar linkages 20A, 20B. The respective linkages 20A, 20B are located so that they are adjacent the two sides of the platform. The width of a platform 16 is established in the preferred embodiment so that it will pass between the wheel wells of a standard, full-sized pickup bed. The space between those wheel wells in a modern American-made pickup is about 49 inches. Accordingly, a typical platform 16 will have a width of about 48 inches and a length of about 96 inches; and the four-bar linkages will be separated so that their outer sides will be slightly less than 48 inches apart. This will permit the four-bar linkages 20A, 20B to fit inside the space defined by the depending sidewalls of the platform 16. The length has been selected to fit in a typical long wheelbase pickup truck. If a short wheelbase pickup truck is to be used as the carrier, the platform may be made shorter or the base may be reinforced so that it can protrude rearwardly beyond the rear end of the truck's box.

Figure 3:
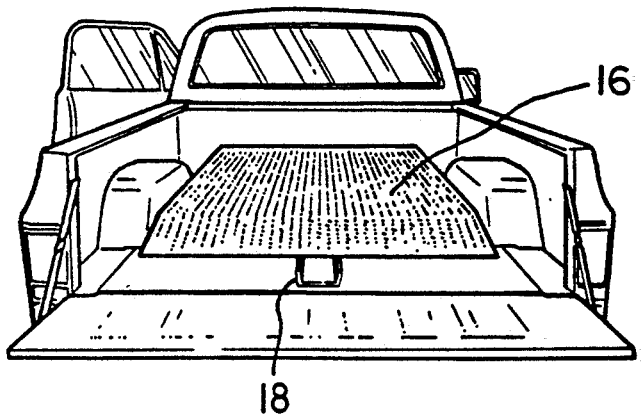
FIG. 3 is a perspective view of a truck as seen from the rear, with the platform being shown in its lowest position, and wherein the top of the platform is above the floor of the truck's box but significantly below the top of the truck's sidewalls.
Figure 6:
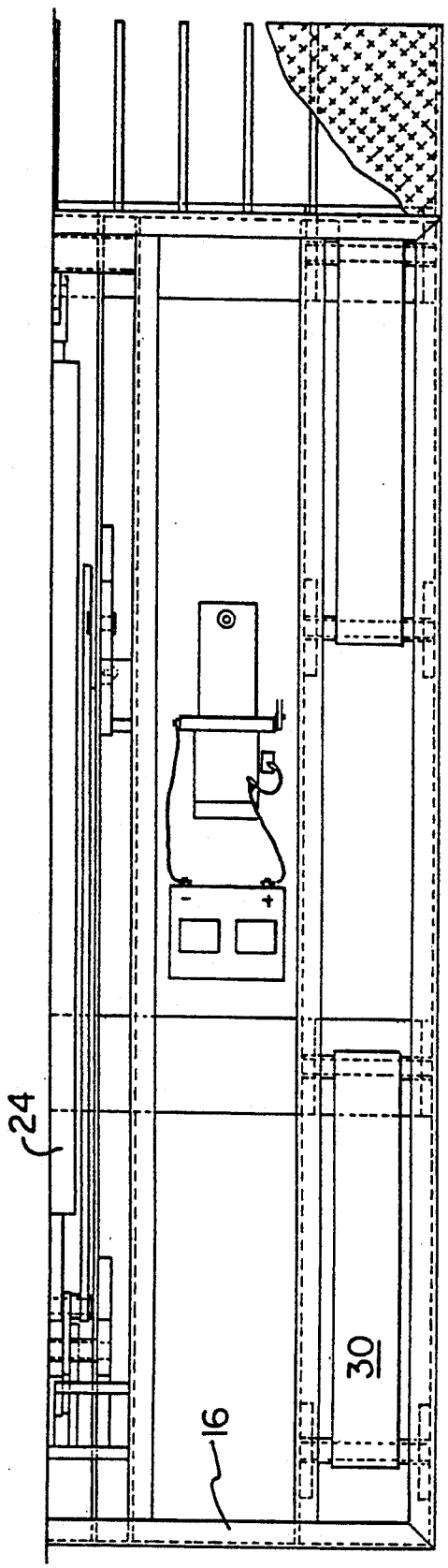
FIG. 6 is a top plan view of the left half of the apparatus shown in FIG. 5, with much of the tread plate being broken away in order to reveal the structure that gives the platform its rigidity, and the right half of the apparatus being omitted because it is essentially a mirror image of the left half.
Figure 7B:
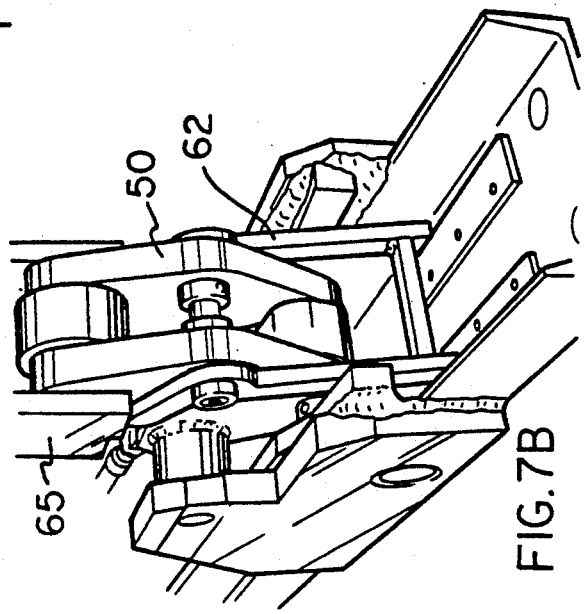
FIGS. 7A, 7B, 7C, 7D and 7E are perspective views of the bell crank mechanism showing the bell crank in several positions, beginning with its most upright (highest) position and continuing with intermediate positions as it moves down to its lowest position.
Figure 7A:
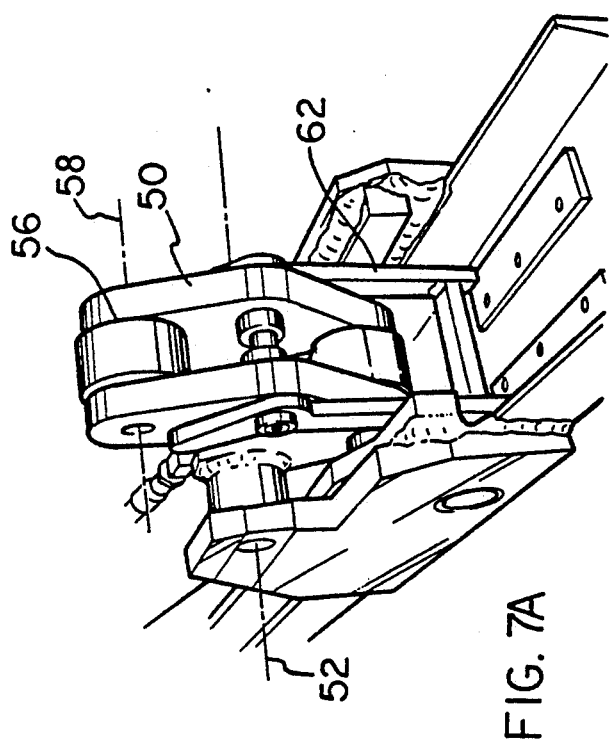
Figure 7C:
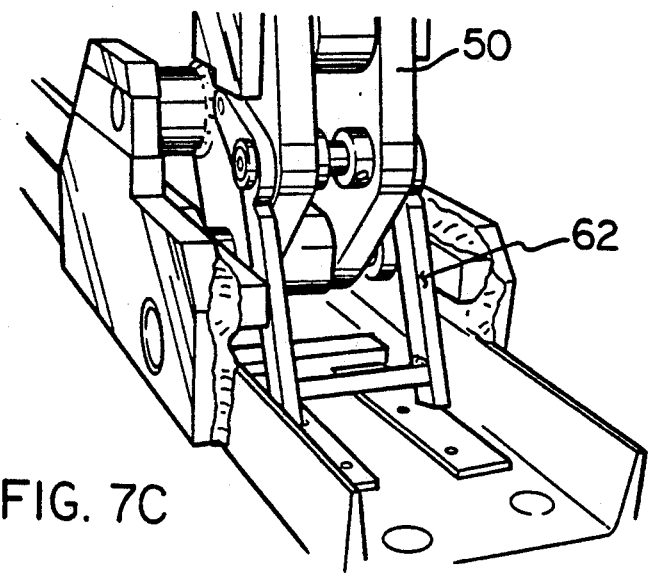
Figure 7D:
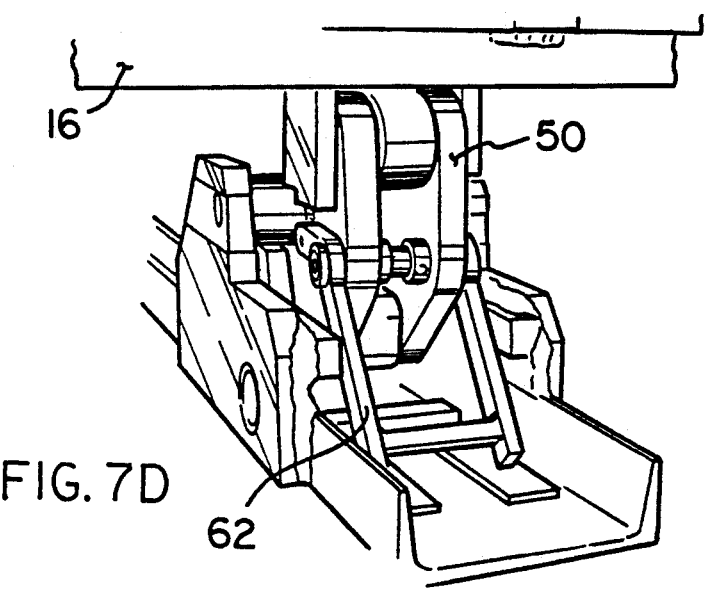
Figure 7E:
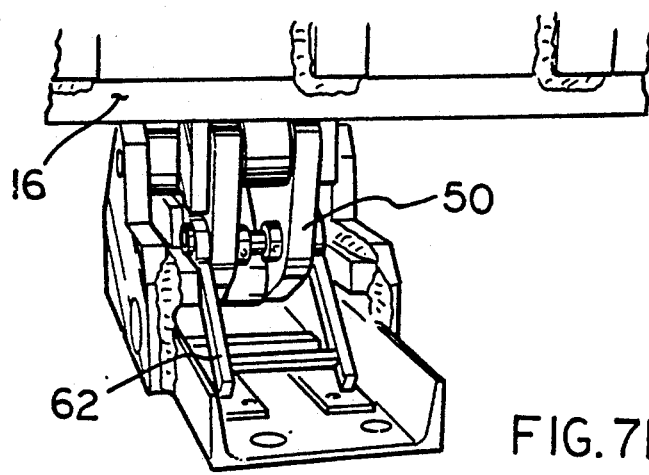

Referring additionally to FIG. 3, the platform 16 is shown in its low position—at which it is in close proximity to the base 18. Of course, the top of the platform can never be as low as the base, because the platform must have at least some thickness in order to resist the bending forces to which the platform is subjected when when a load is resting on top of the platform and the platform has been raised off the bed. The difference in elevation between the platform 16 in its first, low position (FIG. 3) and a second, high position (FIG. 1) in accordance with a preferred design is about 15-20 inches. By making the legs of the four-bar linkage about 24 inches, the difference in elevation between the low and high positions can be about 20 inches. The length of the legs minus the absolute elevation of the platform (with respect to the truck's frame—when the platform is in its low position) establishes the maximum possible increase in elevation.

Also visible in FIG. 2 is a double-acting hydraulic cylinder 22 having a barrel 24 and an extensible rod 26 that is connected to a piston (not shown) inside the barrel. The hydraulic cylinder 22 is connected at its lower end to the base, and the extensible rod 26 is connected at its upper end to the platform 16, such that extension of the rod will cause the platform to be raised with respect to the base. A suitable hydraulic pump for supplying pressurized hydraulic fluid to the cylinder is a J. S. Barnes 12 volt DC powered pump, rated at 3000 maximum psi with a flow rate of approximately 1.3 gallons per minute; it can supply a greater quantity (2.8 gallons per minute) at a lower pressure, i.e., 500 psi. Built into the pump is a standard counterbalance valve to prevent the cylinder from "running away," once the load goes over top dead center.

Turning next to FIG. 4, the platform 16 is shown in an elevated position, with the four-bar linkage 20B (the right linkage) being shown as including a front leg 30 and a rear leg 32. For simplicity in this particular view, the legs 30, 32 are represented by single straight lines. When the legs 30, 32 are of the same length, they will be generally parallel and the platform 16 will be parallel to the base 18. However, in the real world, the parking ramps that are routinely found in front of shipping docks are not always level. In fact, there probably are more downwardly sloping ramps than there are level ones. If a truck slopes downwardly to the front, then the base 18 on that truck will also slope downwardly; and when a load is placed on a platform 16, the load conceivably could have a tendency to roll toward the cab of the truck. It is desirable, therefore, to build in a slight downward slant to the platform 16—toward the rear, by making the front leg 30 slightly longer than the rear leg 32. Lengths for the respective legs 30, 32 in a preferred embodiment are 25 inches and 24 inches. The front of the platform will then be about four inches higher than the rear of the platform when the platform is elevated and the truck is parked on level ground. This upward slope is not so great as to make it impractical to push a pallet jack onto an elevated platform; but it is enough to help offset a downwardly sloping concrete ramp, so that a load does not tend to roll away from a dock worker and move too quickly toward the cab of the truck. Also visible in this FIG. 4 is an integral and fixed ramp 40 at the rear of the platform 16. This ramp 40 helps ensure that the wheels of a pallet jack, "mule," fork-lift truck, etc., can more readily roll onto the platform 16 from the loading dock—and vice versa.

It will also be apparent in FIG. 4 that the front and rear legs 30, 32 have already passed their vertical position (at which the platform 16 is at top-dead center), such that the platform has now begun to descend toward the dock. The platform 16 has also moved rearwardly with respect to the static base 18, and now projects rearwardly well beyond the vertical plane defined by the rearmost part of the lowered tailgate. Hence, the original tailgate may be left on the truck and serve (when it is raised) in a normal manner to secure goods within the truck's box. And when the platform 16 is to be used to load or unload goods, there is no risk of injuring a lowered tailgate as a result of trying to back up a truck in order to get extremely close to a vertical wall below a shipping dock.

Also visible in FIG. 4, at the left side of the figure, is a bell crank arrangement that is particularly useful in beginning to elevate the platform 16 as the hydraulic cylinder 22 begins its initial extension. Referring additionally to FIGS. 7A, 7B, 7C, 7D and 7E, the bell crank assembly includes a bell crank 50 that is configured to pivot about a bearing whose center is coincident with the horizontal axis 52. Another horizontal axis 54 locates the center of a pin that connects the bell crank 50 to the barrel end of the hydraulic cylinder 22. As the hydraulic cylinder 22 is initially pressurized to raise the platform 16, and as a force is thereby generated along a longitudinal axis between the two ends of the hydraulic cylinder, that force will be applied at the point represented by axis 54. Also visible at the left side of FIG. 4 is a roller 56 that pivots about horizontal axis 58. The peripheral surface of roller 56 is in contact with the lowest surface of cam plate 60, which is rigidly affixed to the bottom of platform 16. Therefore, as bell crank 50 begins to rotate in a clockwise direction around axis 52, the roller 56 will begin to rise, causing cam plate 60 to be lifted. Rolling contact between cam plate 60 and the peripheral surface of roller 56 is preferred; but some equivalent low-friction device could be substituted for the combination that is illustrated. That is, two contacting plates covered with DuPont's Teflon resin might also provide appropriate low-friction contact between the bell crank 50 and the platform 16; but the roller 56 definitely offers more reliable and predictable contact.

If there was ample room under the base 18 to place a vertically inclined hydraulic cylinder, such that the angle between the cylinder and the platform could be significant even when the platform was in its lowest position, then perhaps the bell crank 50 described above might not be necessary. But one object of this invention is to provide a total package which has a very low profile and which can be installed on a pickup truck or the like—without requiring major alteration of either the truck or its box. One reason for this is that the lifting platform described herein could conceivably outlast the truck on which it is installed; and it would be desirable to be able to remove the apparatus 14 from a first truck and put it in another, without defacing the original truck. Hence, it is believed to be advantageous that the apparatus can be removed from a truck by removing only a few small mounting bolts, leaving the truck's box essentially unaffected. Another reason for favoring compactness or thinness of the apparatus 14 is that it is preferred that at least a significant portion of the sidewalls of the truck's box should remain above the top of the platform when the platform is fully lowered. This allows to sidewalls to function in the manner in which they were intended, namely, to hold a load safely within a truck's box even when a truck is forced to negotiate a tight turn that might otherwise sling a load sideways off the truck. And the more compact the apparatus is (as far as its height is concerned), the more appropriate it is that the design include a bell crank to foster initial upward movement of the platform.

While bell crank per se are certainly not novel mechanisms, the geometry of this particular platform and its lifting apparatus does introduce a new problem. When the platform 16 is being pushed upward, there will be a pushing force exerted by cylinder 22 (at the point represented by axis 54) until such the arms 30, 32 are essentially vertical. Then, as the platform 16 moves just beyond top-dead center, the weight of the platform 16 (and any load that may be on it) will cause the platform to begin what may aptly be described as a controlled fall—to the right (in FIG.4). This will mean that an unrestrained bell crank 50 would immediately begin to rotate counter-clockwise, as the cylinder 22 began to move downward with a falling platform. To prevent this unwanted counter-clockwise rotation of the bell crank 50, a rotatable link 62 is provided. As indicated in FIG. 4A, the link 62 functions as a mechanical stop to prevent the bell crank from rotating backward until such rotation is appropriate. Besides helping to preclude what might amount to an essentially "free fall" of the platform 16 as it moves rearwardly (after it passes top-dead center), the mechanical stop 62 also precludes counter-clockwise rotation of the bell crank 50 when the double-acting cylinder 22 is pressurized in its retraction mode, as a part of the platform-lowering motion. If stop 62 were not present, then bell crank 50 could rotate to a position similar to that shown in FIG. 5, at the time that the platform is being pulled forward in preparation for lowering. Hence, it is believed that some mechanism for selectively preventing rotation of the bell crank 50 should be provided as part of the bell crank assembly.

Of course, after the stop 62 has served its purpose in inhibiting counter-clockwise rotation of the bell crank 50 at the correct time (represented by its illustration in FIG. 7A), there must be some way of moving the stop away from its operative position as the platform is being lowered; otherwise the bell crank could not be returned to the relationship shown in FIG. 5. Moving the pendulum-like stop 62 from its operative position is accomplished by providing a structural extension 64 on the opposite side of its support, and providing sufficient clearance such that its support becomes what will hereafter be referred to as pivot axis 66. As the platform 16 descends to a point where it is close to bell crank 50, a depending structural member 65 on platform 16 makes contact with extension 64 and rotates mechanical stop 62 (about axis 66) in a clockwise direction so that it no longer bears against any part of base 18. Progressive movement of the mechanical stop 62 is illustrated in FIGS. 7B, 7C, 7D and 7E. At such time that the platform 16 is again being raised, and when bell crank 50 begins to rotate clockwise, tension spring 68 (which is connected at one end to stop 62 and connected at its other end to base 18) will cause the stop to rotate back to its vertical or operational orientation.

Referring once again to FIG. 4, it is useful to have an additional bell crank 70 located on the base 18 at a position where it will provide a lifting force—like that provided by bell crank 50—at a point closer to the rear end of the platform. The bell crank 70 may be thought of as a "slave" whose movement is dictated solely by controlled movements of the first bell crank 50. Bell crank 70 pivots about an axis 72, which is at the same elevation as axis 52. Axis 78 serves as the axis of rotation for a roller 76 whose function is equivalent to that of roller 56. Roller 76 bears against a plate 80 on platform 16 when the platform is lowered to a position near the base. Perhaps it should be mentioned that the slave crank 70 is not a mandatory part of this apparatus; but it does provide a degree of uniformity in upward and downward movement as to make it a desirable, though ancillary, component of an optimized apparatus.

When a mobile system in accordance with this invention is to be used, it first must be installed on a vehicle, e.g., a truck. A variety of so-called light-duty trucks such as pickup trucks and cargo vans are available at prices that are much less than specialized, heavy duty trucks. An apparatus can be installed in many such trucks, to provide an expensive performance at a modest price. As long as there is room to accommodate the platform, there will usually be no trouble involved in installing the apparatus. An apparatus having a platform 16 made of aluminum and sized to be about four feet wide and eight feet long will weigh about 500 pounds, which will usually leave hundreds of pounds of cargo capacity available in most light-duty trucks. A few sturdy bolts will readily attach the base 18 to the frame of the truck, so that the apparatus can be easily transported. An hydraulic pump and an auxiliary battery may also be needed, unless the truck already has such equipment. The initial installation time may take more than an hour, because of the need to drill a few bolt holes. But once the holes are present, an apparatus in accordance with this invention can be installed in or removed from a truck in a very short time. And the relatively light weight of a platform that is fabricated from aluminum will make it possible to handle either the installation or removal of a platform from a pickup truck with only the manual effort of three or four men.

Once installed, an apparatus is ready for immediate use. Assuming that a load is to be picked up from a high dock, the truck is backed up to the dock and the tailgate lowered. A valve is actuated to begin to pressurize the cylinder 22, and the platform will immediately begin to rise. Regardless of whether the rear end of the platform is fixed or foldable, the platform will move upward and backward until such time as the rearmost end of the platform lies over the front edge of the dock. A forklift truck or other wheeled device can then approach the rear end of the platform and deposit the load onto the top surface of the platform. The cylinder 22 would then be retracted, which would bring the platform forward enough to clear the dock and allow the cargo to be lowered into the truck's box.

Assuming that the truck has now been driven to another warehouse or building with high docks, the truck is then backed toward the dock in the same manner that it was when the truck was empty. But this time, the truck will be loaded and the truck's rear springs may be compressed by an amount that deserves some consideration. After the platform 16 has been raised from its low, transport mode and has been moved backward to contact the dock, it is advantageous to continue to supply pressurized fluid to the cylinder. This can cause the rearmost end of the platform to push downward on the dock; and since a concrete or wooden dock is not going to respond by moving down, the rear end of the truck must of necessity begin to come up. Expressed in other words, the platform can be used to transfer some of the load's weight to the dock even while the load is still present on the platform. This step will prevent the rear end of the truck from bouncing upward by an inch or two just as soon as the load is pulled onto the dock, as a result of relieving the compression force on the truck's springs. The small size of such a bounce will not be of major significance as far as absolute or total height is concerned; but it might startle someone who is standing on the platform, or cause the person to lose his or her balance.

If the load that is to be carried by a pickup truck is wider than the space between the sidewalls of a pickup's box, an apparatus in accordance with this invention can be particularly useful. Referring next to FIGS. 8A and 8B, a platform is shown in an intermediate position, higher than its standard low position—but lower than its normal high position. In this intermediate position, the platform is capable of transferring the weight of an oversize load directly to the frame of the truck, without putting the sidewalls at risk. But by lowering the platform just enough so that the vertical sidewalls begin to support a small amount of the load, the load can be more significantly stabilized on the truck. This stabilization occurs because the sidewalls will naturally be spaced apart by a distance that is greater than the width of the platform.

Now that both the structural features and methods of using the lifting apparatus have been disclosed in great detail, it is probably appropriate that certain theories about the apparatus be discussed. One reason that the preferred embodiments include a bell crank assembly is that the lifting apparatus can be made stronger and thinner—and with more economy. But if someone is willing to forgo economy, strength, speed of operation and/or compactness, then the concept of a lifting platform with a four-bar linkage could still be used to advantage to produce a useful device. For example, an apparatus that uses the same hydraulic cylinder and pump that has been disclosed herein could be used without the bell crank and still raise a modest load of about 1,000 pounds from a rest position adjacent the bed of a pickup truck. With a bell crank mechanism as disclosed herein, that lifting ability of the apparatus 14 is increased to about 8,000 pounds, and the rate of movement is relatively fast. Alternatively, the single hydraulic cylinder that has been disclosed herein could be replaced with two cylinders, one of which has an increased angle of attack with respect to the platform, such that it will function somewhat like the bell crank mechanism in getting the platform initially raised to the extend that the angles at which upward forces are applied are advantageous.

Still another embodiment could be created in which the hydraulic cylinder is mounted below the base, e.g., within the space that exists between the frame members of a truck. Of course, such an embodiment would require that there be more labor to customize the installation of a lifting apparatus for essentially each kind of truck that is to be fitted with a lifting apparatus. This would mean giving up an advantage of the apparatus 14 with respect to being able to market a single product that can be easily installed on trucks manufactured by Chrysler, Ford, General Motors, etc., without having to make any special accomodation for any of them. But as long as the lifting platform both raises a load (from the frame of a truck) and translates the load backward (toward a high dock), then an apparatus may be thought of as falling with the concept of the invention. It is the four-bar linkage, of course, that provides this lifting and translating movement; and any really meaningful variation on the theme disclosed herein should probably have a linkage which is sized to lift a load somewhere in the vicinity of 20 inches above a truck bed, and to translate the load backward at least 8 inches—to span the gap between a truck's rear bumper and the dock.

Another way of exploiting the invention disclosed herein is to transfer merchandise or heavy goods directly from a large truck or trailer to one or more pickups, each of which has a lifting apparatus 14 as disclosed herein. That is, it is not necessary that merchandise be off-loaded from a big truck into a warehouse, and then moved out of the warehouse onto a platform 16 in some small trucks. It would save handling time and steps to take some things directly to small trucks—for delivery as expedited freight or the like. And the large multi-wheel trucks will have the same height as the docks to which they customarily back up to for unloading merchandise. The platform 16 disclosed herein should be recognized as being capable of reaching a high truck just as well as it reaches a high dock.

Having now described the preferred embodiments of the invention in great detail, it should now be apparent to those skilled in the art that variations and modifications could be made without departing from the spirit of the invention. Accordingly, the invention should be understood to be measured only by the scope of the claims that are appended hereto.

What is claimed is:

1. An apparatus adapted for attachment to a truck, the truck having a front and a rear and a longitudinal axis therebetween, and having two sides designated as right and left sides, and the truck having a frame and a bed secured to the frame near the rear of the truck, and the apparatus being adapted for attachment to the frame on top of the bed for the purpose of lifting a heavy load with respect to the bed, comprising:
   a. a generally planar base adapted for attachment to the frame of a truck in the vicinity of the truck's bed;
   b. a platform positioned above and connected to the base with a pair of four-bar linkages, and one of said pair of linkages being associated with each of the two sides of the truck, and each of said linkages including at least one set of rotatable and approximately parallel legs, and said platform having a first, low position at which it is in close proximity to the base, and said platform having a second, high position at which it is appreciably higher than the base;
   c. a double-acting hydraulic cylinder having a barrel and an extensible rod, and the hydraulic cylinder having first and second ends and a longitudinal axis between said two ends, and the hydraulic cylinder being functionally anchored at its first end to the base and connected at its second end to the platform, and the platform being connected to the base in such a way that extension of the rod will cause the platform to be raised with respect to the base;
   d. a bell crank having two arms with pendant and distal portions, and having a central region that lies between the pendant portions of the two arms, and the bell crank being pivotaly connected to the base through a pivot pin that passes through the bell crank's central region, and the bell crank also being pivotaly connected at the distal portion of one arm to the first end of the hydraulic cylinder, and the bell crank's other arm being configured to apply an upwardly supporting force on the platform only when the platform is near its first, low position, and the platform being in load-supporting contact with said other arm of the bell crank only when the platform is near its first, low position; and
   e. means for selectively pressurizing the hydraulic cylinder to cause extension and retraction of the rod.

2. The apparatus as claimed in claim 1 wherein the longitudinal axis of the hydraulic cylinder forms an angle with respect to the base of about 2 degrees when the platform is in its low position, and an angle of about 9 degrees when the platform is in its high position, whereby the apparatus may be aptly described as having a relatively compact profile as view from one of its sides.

3. The apparatus as claimed in claim 1 wherein the four bar linkages have rotatable legs that are about 24 inches long, and wherein the vertical distance between the first, low position of the platform and its second, high position is about 18 inches.

4. The apparatus as claimed in claim 1 and further including a low-friction device connected to the distal portion of said other arm of the bell crank in such a way as to make contact with and provide at least partial support for the platform when the platform is near its low position.

5. The apparatus as claimed in claim 4 wherein the low friction device constitutes a roller having a peripheral surface and an axis of rotation that is perpendicular to the direction of movement of the platform as the platform translates from its low position to its high position, and the roller being mounted in such a way that the peripheral surface of the roller will make contact with a structural part of the platform when the platform is near its low position.

6. The apparatus as claimed in claim 1 and further including a mechanical stop for preventing the bell crank from rotating about its central pivot pin when the rod is fully extended and the hydraulic cylinder is pressurized in such a way as to begin retracting the rod into the barrel.

7. The apparatus as claimed in claim 6 and further including means for moving the mechanical stop out of the way when the platform nears its low position, whereby the bell crank may be rotated about its central pivot pin when the platform nears its low position.

8. The apparatus as claimed in claim 1 wherein the two pivotable legs of the four-bar linkage move through a maximum angle when the hydraulic cylinder is pressurized so as to cause the platform to move all the way between two extreme positions identifiable as its first, low position and its second, high position, and wherein the maximum angle through which the two legs move is approximately 120 degrees, such that the platform moves in an arc from its first, low position to a higher position and then begins to descend as it continues to move toward the second, high position which is its other extreme position.

9. The apparatus as claimed in claim 1 wherein the base is sized to fit in the bed of a pickup truck which normally rests with an upright orientation above the ground that is present under the pickup truck, and the bed has a nominal height of about 32 inches from the ground, and wherein the platform is movable to a high position of about 18 inches above the bed, whereby a pickup truck may be used to load and unload merchandise onto a shipping dock having a conventional height above the ground of about 48 inches.

10. The apparatus as claimed in claim 1 wherein the truck has a cab near its front and the platform has a width of about 48 inches and a length of about 96 inches, and wherein the platform has forward and rear ends, and the forward end is adapted to be placed near the cab of the truck, and the rear end of the platform has a downwardly sloping ramp, whereby the task of moving a load onto and removing a load from the platform will be facilitated by the ramp.

11. The apparatus as claimed in claim 1 wherein the legs of each of the four-bar linkage constitute two generally horizontal legs and two pivotal legs, and wherein the two pivotal legs of a given linkage are not of equal length, and wherein the front legs are longer than the rearward legs, whereby the platform has an upward tilt at its front when the platform has been elevated to its second, high position.

12. The apparatus as claimed in claim 1 wherein the platform has a front and a rear and it slopes downwardly from its front to its rear when the platform is in its second, high position, whereby the slope of the platform will compensate for the downward slope of a concrete ramp upon which a truck may be parked, and whereby the manual task of rolling a wheeled device from a loading dock onto the platform will be facilitated by the existence of two offsetting slopes.

13. An apparatus adapted for attachment to a truck, the truck having a frame, front and rear ends, and right and left sides, and the apparatus being adapted for attachment to the frame near the truck's rear end for the purpose of lifting a heavy load with respect to the frame, comprising:

a. a generally planar base adapted for attachment to the frame of a truck in the vicinity of the truck's rear end;

b. a platform positioned above and connected to the base with a pair of four-bar linkages, and one of said pair of linkages being associated with the right and left sides of the truck, respectively, and each of said linkages including at least one set of rotatable and approximately parallel legs, and said platform having a first, low position at which it is in close proximity to the base, and said platform having a second, high position at which it is appreciably higher than the base;

c. a double-acting hydraulic cylinder having a barrel and an extensible rod, and the hydraulic cylinder having two ends and a longitudinal axis between said two ends, and the hydraulic cylinder being functionally anchored at one of its ends to the base and connected at its other end to the platform, and the platform being connected to the base in such a way that extension of the rod will cause the platform to be raised with respect to the base, and the cylinder and its associated rod being sufficiently long that the platform will both rise and translate rearwardly with respect to the base when the platform is in its low position and the cylinder is pressurized;

d. means for selectively pressurizing the hydraulic cylinder to cause extension and retraction of the rod; and e. a bell crank assembly interjected between the barrel end of the hydraulic cylinder and the base, such that forces generated when the hydraulic cylinder is pressurized will be passed through the bell crank assembly to the base, and the bell crank assembly having a bell crank with two diverging arms, and a first one of said two arms being effective to apply a lifting force to the platform when the platform is near its first, low position and the cylinder is pressurized, and the other arm being effective to apply a lifting force to the platform when the cylinder is pressurized and the platform is substantially removed from the first, low position, and the platform being in load-supporting contact with the first arm of the bell crank only when the platform is near its first, low position.

14. The apparatus as claimed in claim 13 wherein the bell crank assembly includes at least two bell cranks, the first one of which is pinned directly to the hydraulic cylinder, and the second bell crank being connected to and functioning as a slave of the first bell crank, such that the second bell crank will be acted on in a derivative fashion as a result of motion of the first bell crank.

15. The apparatus as claimed in claim 13 wherein the platform is moved upward with respect to the base by a distance of about 20 inches and rearwardly by a distance of at least 8 inches when the platform is initially in its first, low position and then the hydraulic cylinder is pressurized so as to move the platform all the way to it second, high position.

* * * * *